United States Patent
Bruno et al.

(10) Patent No.: US 10,962,080 B2
(45) Date of Patent: Mar. 30, 2021

(54) HYDRAULIC LINEAR ACTUATOR WITH A LOCKING SYSTEM FOR LOCKING THE COMPRESSION MOVEMENT OF THE ACTUATOR

(71) Applicant: SISTEMI SOSPENSIONI S.p.A., Corbetta (IT)

(72) Inventors: Walter Bruno, Asti (IT); Piero Antonio Conti, Asti (IT); Giordano Greco, Turin (IT); Massimo Seminara, Asti (IT); Matteo Vergani, Cernusco sul Naviglio (IT)

(73) Assignee: SISTEMI SOSPENSIONI S.p.A., Corbetta (IT)

( * ) Notice: Subject to any disclaimer, the term of this patent is extended or adjusted under 35 U.S.C. 154(b) by 69 days.

(21) Appl. No.: 16/305,807

(22) PCT Filed: Jan. 23, 2018

(86) PCT No.: PCT/EP2018/051557
§ 371 (c)(1),
(2) Date: Nov. 29, 2018

(87) PCT Pub. No.: WO2018/134433
PCT Pub. Date: Jul. 26, 2018

(65) Prior Publication Data
US 2020/0325954 A1 Oct. 15, 2020

(30) Foreign Application Priority Data
Jan. 23, 2017 (IT) .................... 102017000006900

(51) Int. Cl.
*F16F 9/46* (2006.01)
*F16F 9/06* (2006.01)

(52) U.S. Cl.
CPC ............... *F16F 9/461* (2013.01); *F16F 9/06* (2013.01)

(58) Field of Classification Search
CPC .... F16F 9/06; F16F 9/187; F16F 9/325; F16F 9/34; F16F 9/461; F16F 9/516
See application file for complete search history.

(56) References Cited

U.S. PATENT DOCUMENTS 5,586,627 A * 12/1996 Nezu .................... B60G 17/08
188/266.6
5,788,030 A * 8/1998 Rottenberger ............ F16F 9/34
188/290
(Continued)

FOREIGN PATENT DOCUMENTS

EP    1000782 A2    5/2000
EP    1000782 B1    4/2008
(Continued)

OTHER PUBLICATIONS

International Search Report and Written Opinion of the International Searching Authority for PCT International Application No. PCT/EP2018/051557 dated Apr. 10, 2018.

*Primary Examiner* — Melody M Burch
(74) *Attorney, Agent, or Firm* — Howard & Howard Attorneys PLLC

(57) ABSTRACT

The actuator comprises a cylinder and a rod. The cylinder comprises an inner cylindrical tube and an outer cylindrical tube which extend coaxially to each other along a longitudinal axis (z). The inner cylindrical tube accommodates a plunger which is rigidly connected to the rod and separates an inner volume of the inner cylindrical tube into a compression chamber and an extension chamber, wherein at least the compression chamber contains oil. The inner cylindrical tube and the outer cylindrical tube enclose with each other a reservoir chamber which is permanently in fluid communication with the extension chamber via at least one first passage provided in the inner cylindrical tube and contains a pressurized gas in a first portion thereof and oil in a remaining portion thereof. The cylinder further comprises an intermediate cylindrical tube which extends along the longitudinal axis (z) between the inner cylindrical tube and the outer cylindrical tube and encloses, along with the inner cylindrical tube, an intermediate chamber permanently in fluid communication with the compression chamber via at least one second passage provided in the inner cylindrical tube. The actuator further comprises a check valve associated to the inner cylindrical tube to allow the oil to flow in the direction from the reservoir chamber to the compression chamber only, and an electrically-operated flow control valve which is associated to the intermediate cylindrical tube (Continued)

for controlling the flow of the oil between the intermediate chamber and the reservoir chamber. The flow control valve is movable between a first operating position, in which it allows the oil to flow between the intermediate chamber and the reservoir chamber, and a second operating position, in which it prevents the oil from flowing between the intermediate chamber and the reservoir chamber.

10 Claims, 5 Drawing Sheets

(56) References Cited

U.S. PATENT DOCUMENTS

| | | | | |
|---|---|---|---|---|
| 2010/0300822 | A1* | 12/2010 | Vannucci | F16F 9/342 188/322.13 |
| 2012/0168268 | A1* | 7/2012 | Bruno | F16F 9/325 188/315 |
| 2014/0291089 | A1* | 10/2014 | Konakai | F16F 9/34 188/314 |
| 2015/0047937 | A1* | 2/2015 | Kim | F16F 9/461 188/322.13 |
| 2016/0052361 | A1* | 2/2016 | Yamashita | F16J 15/062 188/266.1 |
| 2016/0265616 | A1 | 9/2016 | Ripa | |
| 2016/0288605 | A1* | 10/2016 | Teraoka | B60G 15/061 |

FOREIGN PATENT DOCUMENTS

| | | |
|---|---|---|
| FR | 2849138 A1 | 6/2004 |
| WO | 2015075016 A1 | 5/2015 |

\* cited by examiner

HYDRAULIC LINEAR ACTUATOR WITH A LOCKING SYSTEM FOR LOCKING THE COMPRESSION MOVEMENT OF THE ACTUATOR

CROSS-REFERENCE TO RELATED APPLICATIONS

The present application is a National Stage of International Patent Application No. PCT/EP2018/051557, filed on Jan. 23, 2018, which claims priority to and all the benefits of Italian Patent Application No. 102017000006900, filed on Jan. 23, 2017, both of which are hereby expressly incorporated herein by reference in their entirety.

BACKGROUND OF THE INVENTION

1. Field of the Invention

The present invention relates to a hydraulic linear actuator provided with a locking system for selectively locking the compression movement of the actuator, yet allowing the extension movement.

2. Description of the Related Art

EP 1 000 782 A2 discloses a hydraulic linear actuator including an inner cylindrical tube extending along a longitudinal axis, an outer cylindrical tube coaxial to the inner cylindrical tube, a plunger arranged in a longitudinally slidable manner in the inner cylindrical tube so as to separate the inner volume of the inner cylindrical tube into a compression chamber and an extension chamber which both contain oil and do not communicate with each other through the plunger, a rod rigidly connected to the plunger and extending through the extension chamber, and an electrically-operated valve which is interposed between the compression chamber and the extension chamber and is movable between two operating positions, namely a first operating position in which it allows the oil to flow between the compression chamber and the extension chamber, and therefore allows the assembly formed by the plunger and the rod to move both in the extension direction and in the compression direction, and a second operating position in which it allows the oil to flow between the compression chamber and the extension chamber in the direction from the extension chamber to the compression chamber only, and therefore allows the assembly formed by the plunger and the rod to move in the extension direction only, not in the compression direction.

According to EP 1 000 782 A2 such a hydraulic linear actuator is used in a roll control system for a motor vehicle, which system comprises a torsion bar interposed between two wheels of a same axle of the vehicle, a first hydraulic linear actuator connected on one side to a first end of the torsion bar and on the other side to one of the two wheels and a second hydraulic linear actuator connected on one side to a second end of the torsion bar opposite to the first one and on the other side to the other wheel, and an electronic control unit arranged to monitor one or more operating conditions of the vehicle and to control the valves of each of the two hydraulic linear actuators accordingly.

Other examples of hydraulic linear actuators are known from FR 2 849 138 A1 and WO 2015/075016 A1.

More specifically, FR 2 849 138 A1 discloses a hydraulic linear actuator comprising a cylinder with an inner cylindrical tube, an outer cylindrical tube and an intermediate cylindrical tube, wherein the inner cylindrical tube accommodates, in a longitudinally slidable manner, a blind plunger which separates an inner volume of the inner cylindrical tube into a compression chamber and an extension chamber, wherein the inner cylindrical tube and the outer cylindrical tube enclose with each other a reservoir chamber, wherein the intermediate cylindrical tube and the inner cylindrical tube enclose with each other an intermediate chamber, and wherein the actuator further comprises an electrically-operated flow control valve associated to the intermediate cylindrical tube to control the flow of the oil between the intermediate chamber and the reservoir chamber. This known hydraulic linear actuator is not provided with a system for selectively locking the compression movement of the plunger, thereby allowing the plunger to move in the extension direction only.

SUMMARY OF THE INVENTION

It is an object of the present invention to provide an improved hydraulic linear actuator with respect to the prior art discussed above.

This and other objects are fully achieved according to the invention by virtue of a hydraulic linear actuator described in greater detail in the following description of the invention.

In summary, the invention is based on the concept of providing a hydraulic linear actuator comprising an inner cylindrical tube extending along a longitudinal axis, a blind plunger arranged in a longitudinally slidable manner in the inner cylindrical tube so as to separate an inner volume of the inner cylindrical tube into a compression chamber and an extension chamber, wherein at least the compression chamber contains oil and wherein the plunger sealingly separates the compression chamber from the extension chamber, a rod rigidly connected to the plunger and extending through the extension chamber, an outer cylindrical tube which is arranged coaxially to the inner cylindrical tube and encloses with the latter a reservoir chamber containing a pressurized gas in a first portion thereof and oil in the remaining portion thereof and is permanently in fluid communication with the extension chamber via one or more first passages provided in the inner cylindrical tube, an intermediate cylindrical tube which is arranged between the inner cylindrical tube and the outer cylindrical tube, coaxially thereto, so as to enclose with the inner cylindrical tube an intermediate chamber containing oil, the intermediate chamber being permanently in fluid communication with the compression chamber via one or more second passages provided in the inner cylindrical tube, a check valve associated to the inner cylindrical tube to allow the oil to flow in the direction from the reservoir chamber to the compression chamber only, and an electrically-operated flow control valve associated to the intermediate cylindrical tube to control the flow of the oil between the intermediate chamber and the reservoir chamber, the flow control valve being movable between a first operating position, in which it allows the oil to flow between the intermediate chamber and the reservoir chamber, and a second operating position, in which it prevents the oil from flowing between the intermediate chamber and the reservoir chamber.

By virtue of such a configuration, when the flow control valve is in the above-defined first operating position, the plunger and the rod are allowed to move in both directions, i.e. both in the extension direction and in the compression direction. On the other hand, when the flow control valve is in the above-defined second operating position, only the extension movement of the plunger and the rod is allowed. In other words, when the flow control valve is in the second operating position, the compression movement of the plunger and the rod is locked. The plunger and the rod of the actuator are therefore allowed to move in both directions (extension and compression) or in one direction only (extension) depending on the operating position of the flow control valve.

A hydraulic linear actuator according to the invention has a general architecture similar to that of a conventional three-tube hydraulic damper, and can thus be easily obtained from a three-tube hydraulic damper. Moreover, the above-defined architecture allows to lock the compression movement of the plunger by two simple, and hence not expensive, valves, in particular the check valve that allows the oil to flow in the direction from the reservoir chamber to the compression chamber only, which valve is used in the known two- or three-tube dampers as an intake valve placed on the bottom of the damper.

Furthermore, the use of a third cylindrical tube, that is the intermediate cylindrical tube, between the inner cylindrical tube and the outer cylindrical tube allows to arrange the flow control valve outside the inner cylindrical tube, and therefore to obtain an actuator having a smaller axial size, the travel of the plunger remaining unchanged.

In one embodiment, the flow control valve comprises a valve body extending through the outer cylindrical tube and having communication passages for communication both with the reservoir chamber and with the intermediate chamber, a closure member movable in the valve body to open or close said communication passages, and a solenoid coil for controlling the movement of the closure member.

In one embodiment, the flow control valve further comprises a biasing spring acting on the closure member to univocally determine the position of the closure member in the condition where the solenoid coil is not energized.

The solenoid coil of the flow control valve is preferably placed outside the outer cylindrical tube, so as to make electric connection with the solenoid coil easier.

In one embodiment, the portion of the reservoir chamber containing pressurized gas is the upper portion of that chamber, i.e. the portion positioned on the same side as the rod.

The extension chamber may be filled with oil only, like the compression chamber, or filled with pressurized gas only, or again contain both oil and pressurized gas.

BRIEF DESCRIPTION OF THE DRAWINGS

Further features and advantages of the present invention will become more apparent from the following detailed description, given purely by way of non-limiting example with reference to the appended drawings, where.

DETAILED DESCRIPTION OF THE INVENTION

Figure 1:
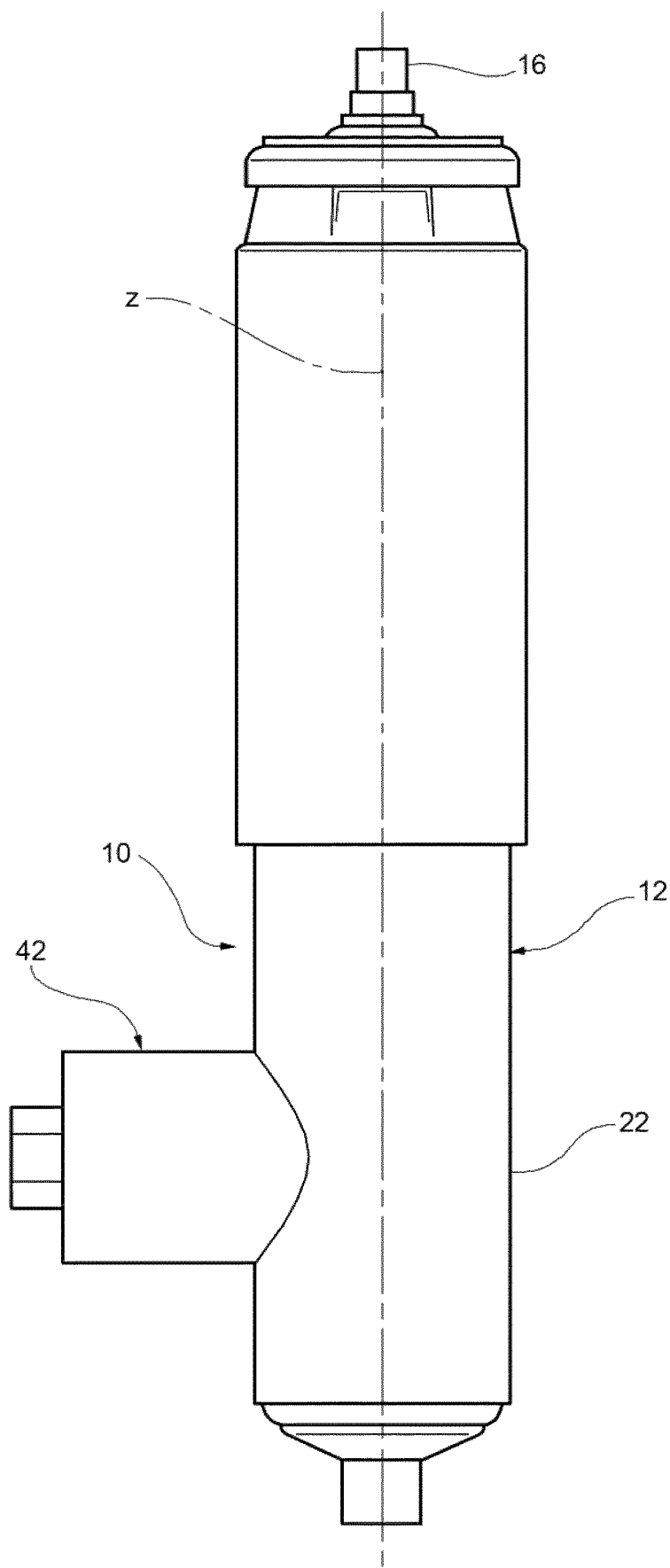
FIG. 1 is a front view of a hydraulic linear actuator according to an embodiment of the present invention.
Figure 2:
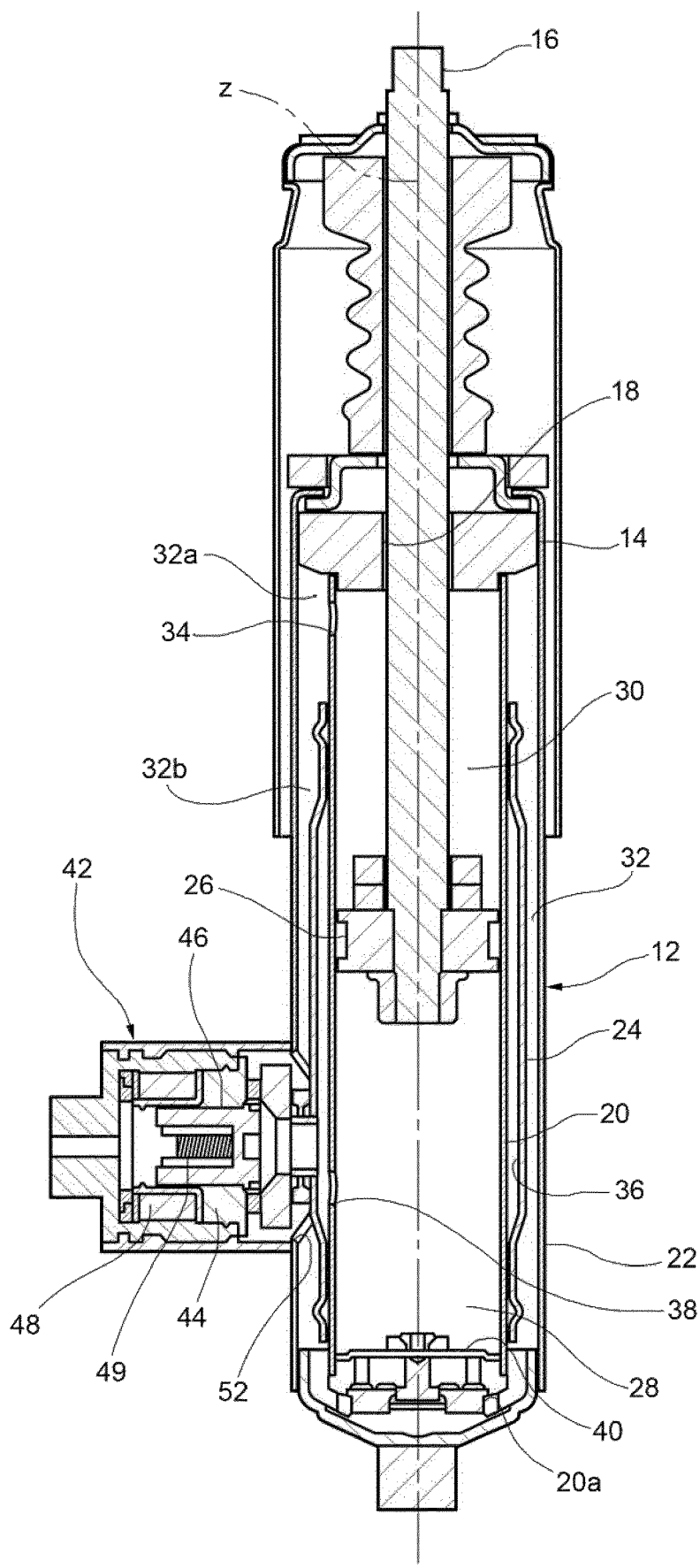
FIG. 2 is an axial section view of the hydraulic linear actuator of FIG. 1.

With reference first to FIGS. 1 and 2, a hydraulic linear actuator (hereinafter simply referred to, for the sake of convenience, as actuator) is generally indicated 10. The actuator 10 extends along an axis z, which in the appended drawings is oriented vertically but might be oriented in any other direction forming an angle with the vertical direction, preferably an angle smaller than 30°. The direction of the axis z will be referred to hereinafter as longitudinal or axial direction.

The actuator 10 basically comprises a cylinder 12 which is closed at its top by a cover 14, and a rod 16 which projects from the top end of the cylinder 12 through a through hole 18 provided in the cover 14 and is movable in either direction along the axis z relative to the cylinder 12.

The cylinder 12 has a three-tube general architecture, with three cylindrical tubes 20, 22 and 24 extending coaxially to each other along the axis z, namely an inner cylindrical tube 20, an outer cylindrical tube 22 and an intermediate cylindrical tube 24.

A plunger 26 rigidly connected to the rod 16 is arranged in the inner cylindrical tube 20 so as to be longitudinally slidable therein. The plunger 26 separates the inner volume of the inner cylindrical tube 20 into a compression chamber 28 (lower chamber) and an extension chamber 30 (upper chamber). The compression chamber 28 is on the opposite side of the rod 16 with respect to the plunger 26, whereas the extension chamber 30 is on the same side as the rod 16 and is passed through by the latter. The plunger 26 is a blind plunger, i.e. a plunger without passages extending therethrough, so that it sealingly separates the compression chamber 28 from the extension chamber 30. The compression chamber 28 is filled with oil. In the embodiment shown in the drawings, the extension chamber 30 is also filled with oil.

The outer cylindrical tube 22 encloses, along with the inner cylindrical tube 20, a reservoir chamber 32 containing pressurized gas in a first portion thereof, indicated at 32*a*, and oil in the remaining portion, indicated at 32*b*. Preferably, the reservoir chamber 32 contains pressurized gas in the upper portion thereof. The reservoir chamber 32 is permanently in fluid communication with the extension chamber 30 via one or more passages 34 provided in the inner cylindrical tube 20. In the embodiment shown in the drawings, the passage(s) 34 is(are) positioned in the portion 32*b* of the reservoir chamber 32 containing oil. The oil may flow through the passage(s) 34 both in the direction from the extension chamber 30 to the reservoir chamber 32 during the extension movement, as the rod 16 moves out of the cylinder 12 and therefore the volume of the extension chamber 30 becomes smaller, and in the direction from the reservoir chamber 32 to the extension chamber 30 during the compression movement, as the rod 16 moves into the cylinder 12 and therefore the volume of the extension chamber 30 becomes larger.

The intermediate cylindrical tube 24 is arranged between the inner cylindrical tube 20 and the outer cylindrical tube 22. The intermediate cylindrical tube 24 encloses, along with the inner cylindrical tube 20, an annular intermediate chamber 36, which is permanently in fluid communication with the compression chamber 28 via one or more passages 38 provided in the inner cylindrical tube 20. The oil may flow through the passage(s) 38 both in the direction from the intermediate chamber 36 to the compression chamber 28 (during the extension movement) and in the direction from the compression chamber 28 to the intermediate chamber 36 (during the compression movement).

In order to allow the actuator 10 to selectively operate according to a first operating condition, in which the assembly formed by the plunger 26 and the rod 16 is free to move in one direction or the other direction, i.e. in the compression direction or in the extension direction, or according to a second operating condition, in which the assembly formed by the plunger 26 and the rod 16 is allowed to move in the extension direction only, thus not the in compression direction, the actuator 10 further comprises a check valve 40 and a flow control valve 42.

The check valve 40 is located on a bottom wall 20a of the inner cylindrical tube 20 to allow flow of the oil through that wall only in the direction from the reservoir chamber 32 to the compression chamber 28 during the extension movement.

The flow control valve 42 is associated to the intermediate cylindrical tube 24 and is arranged to control the flow of the oil between the intermediate chamber 36 and the reservoir chamber 32. More specifically, the flow control valve 42 is movable between a first operating position (FIG. 3), in which is allows the oil to flow between the intermediate chamber 36 and the reservoir chamber 32, and a second operating position (FIG. 4), in which it prevents the oil from flowing between the intermediate chamber 36 and the reservoir chamber 32.

In one embodiment, the flow control valve 42 is an electrically-operated valve, comprising a valve body 44, a closure member (or sliding member) 46 movable within the valve body 44, a solenoid coil 48 for controlling the movement of the closure member 46 and a biasing spring 49 (only shown in FIG. 2) acting on the closure member 46 to univocally determine the position of the closure member 46 in the condition where the solenoid coil 48 is not energized. The valve body 44 is connected to the intermediate cylindrical tube 24 and is in fluid communication on one side with the intermediate chamber 36 via a passage 50 provided in the intermediate cylindrical tube 24 and on the other with the reservoir chamber 32 via one or more passages 52 provided in the valve body 44. In the above-defined first operating position of the flow control valve 42, the closure member 46 leaves the passage(s) 52 open so as to allow the oil to flow between the compression chamber 28 and the reservoir chamber 32 through the intermediate chamber 36 and the valve body 44. On the other hand, in the above-defined second operating position of the flow control valve 42, the closure member 46 closes the passage(s) 52 so as to prevent the oil from flowing between the compression chamber 28 and the reservoir chamber 32 through the intermediate chamber 36 and the valve body 44.

According to an embodiment of the invention, the valve body 44 extends radially beyond the side wall of the outer cylindrical tube 22, whereby the valve body 44 is partially arranged outside the outer cylindrical tube 22. In this case, the solenoid coil 48 is advantageously arranged outside the outer cylindrical tube 22, i.e. outside the cylinder 12, thereby avoiding that the electrical wires for electrical connection of the solenoid coil 48 extend within the cylinder 12 (and thereby avoiding the obvious inconveniences that would otherwise occur).

Figure 3:
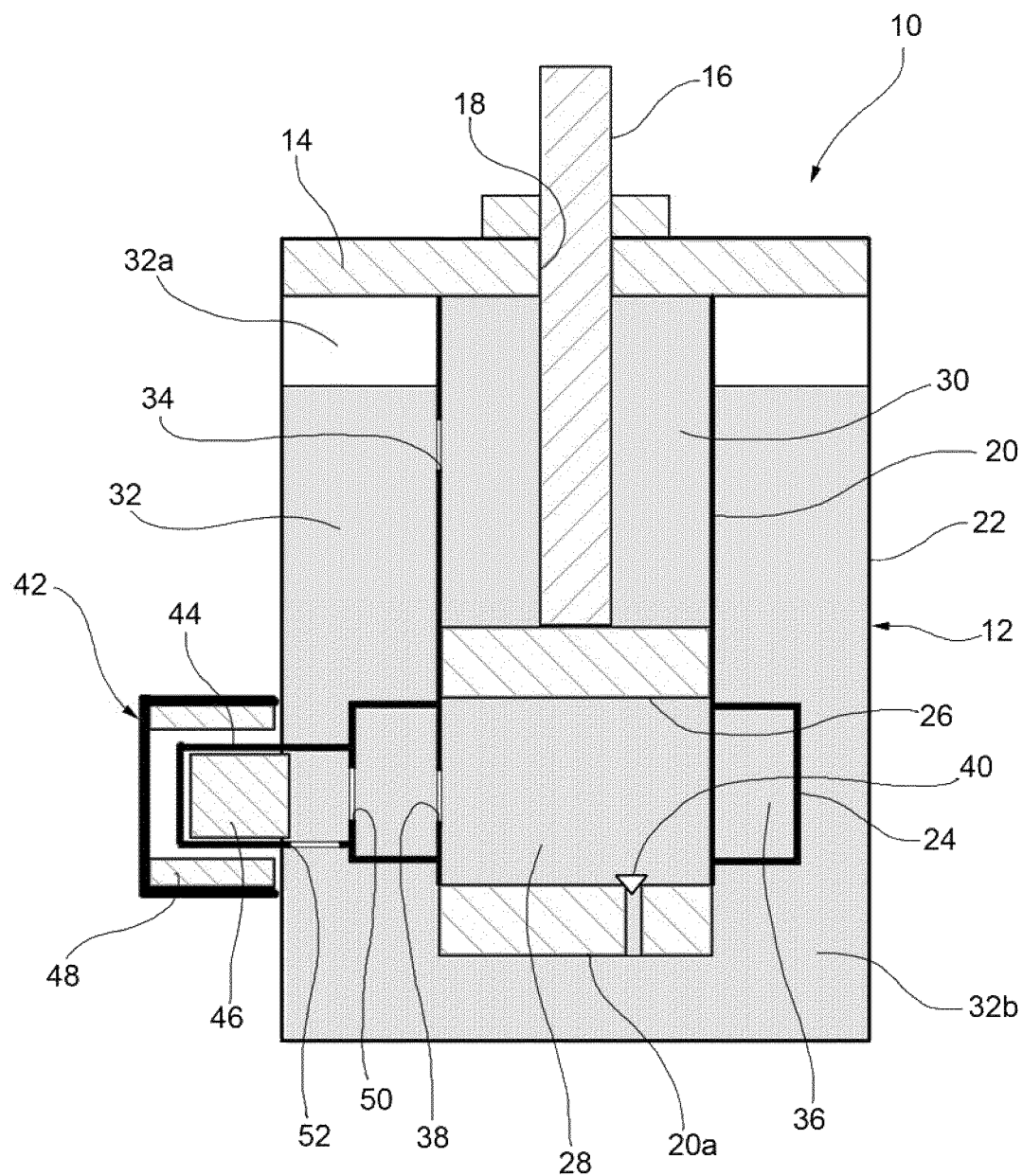
FIGS. 3 and 4 are schematic views of the hydraulic linear actuator of FIG. 1, with the flow control valve in the first operating position and in the second operating position, respectively.
Figure 4:
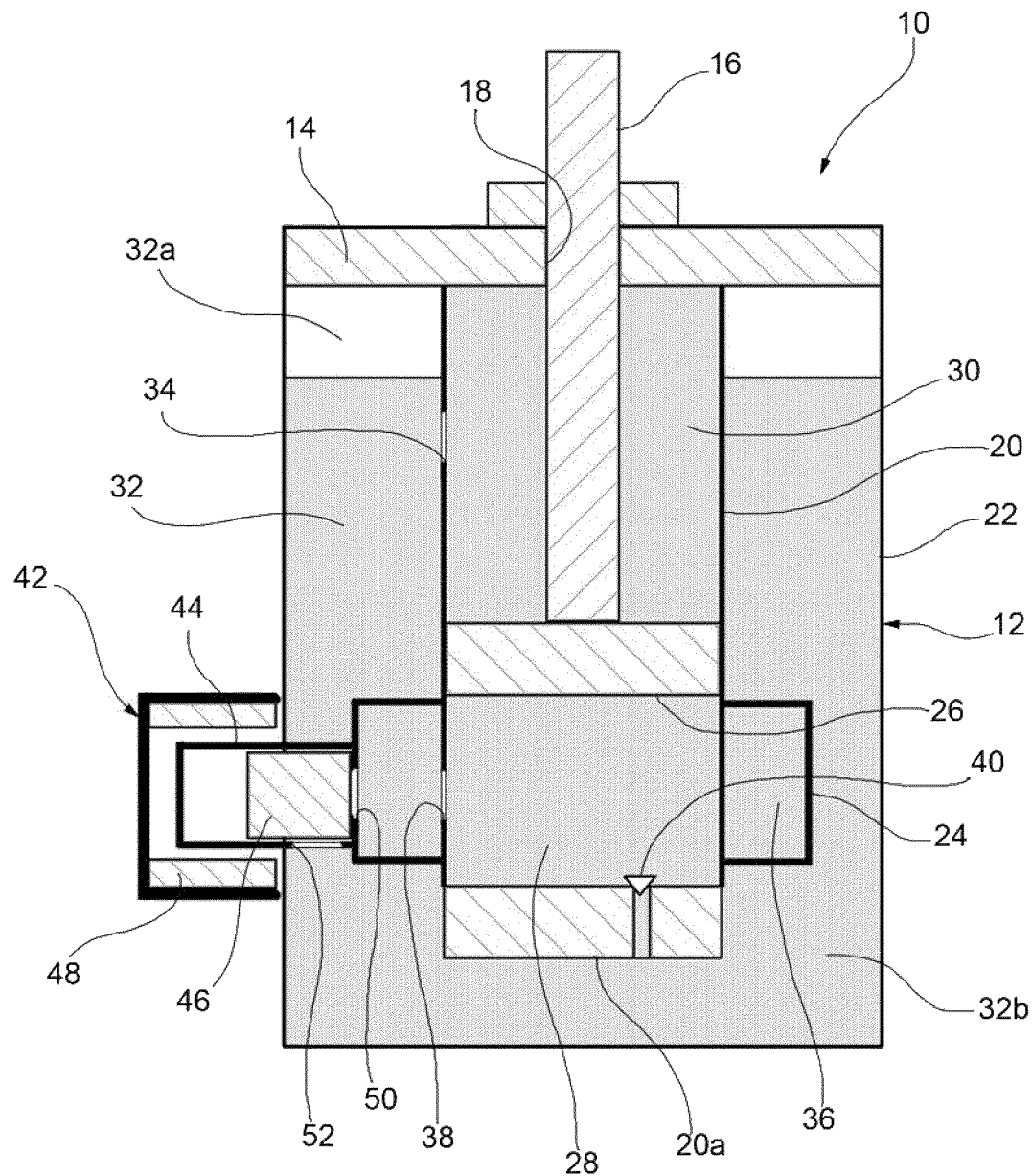

With reference in particular to FIGS. 3 and 4, the actuator 10 described above operates as follows.

When the flow control valve 42 is in the first operating position (FIG. 3), both the extension movement and the compression movement of the actuator 10 are allowed. During the extension movement, in fact, the oil contained in the extension chamber 30 may flow out of that chamber to the reservoir chamber 32 and at the same time the compression chamber 28 may receive oil from the reservoir chamber 32 through the check valve 40 and/or through the intermediate chamber 36 (which in this operating condition is in fluid communication with the reservoir chamber 32 via the passages 50 and 52), whereas during the compression movement the oil contained in the compression chamber 28 may flow out of that chamber to the reservoir chamber 32, passing through the passages 38, 50 and 52, and at the same time the extension chamber 30 may receive oil coming from the reservoir chamber 32 through the passage(s) 34.

On the other hand, when the flow control valve 42 is in the second operating position (FIG. 4), only the extension movement of the actuator 10 is allowed. During the extension movement, in fact, the oil contained in the extension chamber 30 may flow out of that chamber to the reservoir chamber 32 and at the same time the compression chamber 28 may receive oil coming from the reservoir chamber 32 through the check valve 40, whereas during the compression movement the oil contained in the compression chamber 28 cannot flow out of that chamber to the reservoir chamber 32, since the check valve 40 does not allow the oil to flow from the compression chamber 28 to the reservoir chamber 32, but only allows the oil to flow in the opposite direction, and since the passage(s) 52 is(are) closed by the closure member 46 of the flow control valve 42. The rod 16 may therefore be extended up to the maximum extension travel, but cannot be retracted from the position thus reached, as the oil is an incompressible fluid.

Irrespective of the operating position of the flow control valve 42, the pressurized gas in the upper portion 32a of the reservoir chamber 32 generates a resulting force tending to bring the plunger 26 and the rod 16 back to the fully extended position.

According to a further embodiment, the extension chamber 30 may contain not only oil but also pressurized gas or contain pressurized gas only, in which case the oil level in the reservoir chamber 32 will be below the passage(s) 34 of the inner cylindrical tube 20. In such an embodiment, the oil and the pressurized gas, or the pressurized gas only, may flow through the passage(s) 34 both in the direction from the extension chamber 30 to the reservoir chamber 32 (during the extension movement, as the rod 16 projects further from the cylinder 12 and therefore the volume of the extension chamber 30 becomes smaller) and in the direction from the reservoir chamber 32 to the extension chamber 30 (during the compression movement, as the rod 16 retracts further into the cylinder 12 and therefore the volume of the extension chamber 30 becomes larger). In any case, the condition that the oil level in the reservoir chamber 32 is both above the passage(s) 52 provided in the valve body 44 and above the check valve 40 must always be fulfilled, in order for the compression chamber 28, the intermediate chamber 36 and the flow control valve 42 to be always filled with oil only and not to suck in gas.

This further embodiment has in particular the following two advantages.

First of all, it allows to position the passage(s) 34 in the vicinity of the cover 14, and thus to reduce the axial size of the actuator 10, the travel of the plunger 26 remaining unchanged. Secondly, it allows to reduce the amount of oil and to increase the amount of pressurized gas inside the actuator 10, and thus to reduce the weight of the actuator.

Figure 5:
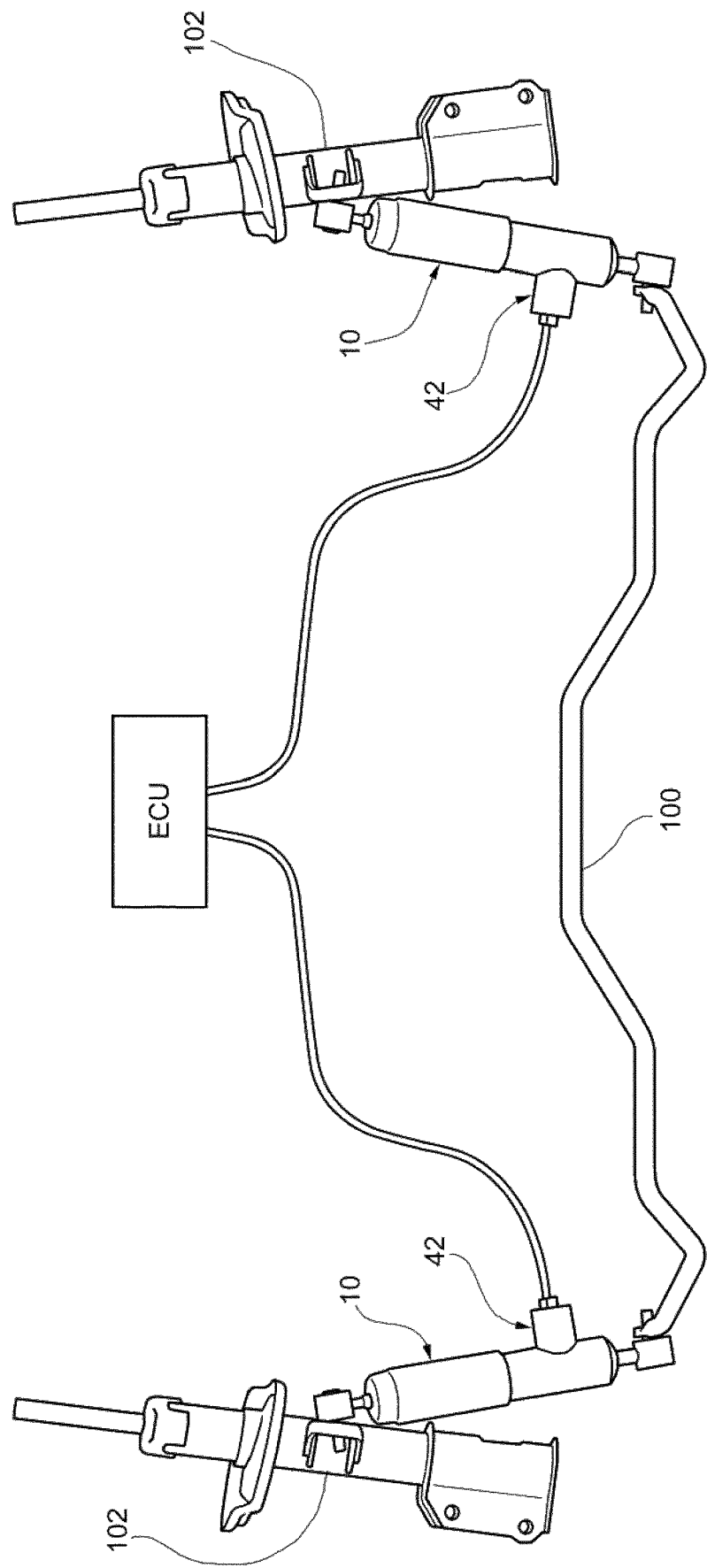
FIG. 5 schematically shows a roll control system for a motor vehicle using a pair of hydraulic linear actuators according to the invention.

FIG. 5 schematically shows a roll control system for a motor vehicle as a non-limiting example of a system to which a hydraulic linear actuator according to the invention is applicable.

With reference to FIG. 5, a roll control system for a motor vehicle comprises a torsion bar 100 interposed between two wheels (not shown) of a same axle of the vehicle, and a pair of hydraulic linear actuators 10 like the one described above with reference to FIGS. 1 to 4. Each of the actuators 10 is connected on one side to a respective end of the torsion bar 100 and on the other to a respective wheel of the vehicle, for example to a respective structural damper 102 of a MacPherson suspension system. The roll control system further comprises an electronic control unit ECU which is arranged to monitor one or more operating conditions of the vehicle and to operate the flow control valves 42 of each of the two actuators 10 accordingly, by energizing the respective solenoid coils.

Typically, in the operating conditions of the vehicle in which roll control is not required, for example when the vehicle is moving on a straight road, the electronic control unit ECU sets the flow control valves 42 of both the actuators 10 in the first operating position, so as to allow both the extension movement and the compression movement of the actuators and thus disconnect the movement of the torsion bar 100 from that of the two wheels. On the contrary, in the operating conditions of the vehicle in which roll control is required, for example during cornering, the electronic control unit ECU sets the flow control valves 42 of both the actuators 10 in the second operating position, so as to lock the compression movement of the actuators and thus connect the movement of the torsion bar 100 to that of the two wheels.

As already stated above, such an application has been illustrated purely by way of example and does not limit the scope of the present invention.

Naturally, the principle of the invention remaining unchanged, the embodiments and the constructional details may vary widely with respect to those described and illustrated purely by way of non-limiting example, without thereby departing from the scope of the invention as defined in the appended claims.

The invention claimed is:

1. A hydraulic linear actuator comprising a cylinder which extends along a longitudinal axis (z) and a rod which projects from an upper end of the cylinder and is movable along the longitudinal axis (z) in a compression direction and in an extension direction relative to the cylinder,
wherein the cylinder comprises an inner cylindrical tube and an outer cylindrical tube which extend coaxially to each other along the longitudinal axis (z),
wherein the inner cylindrical tube accommodates, in a longitudinally slidable manner, a blind plunger which is rigidly connected to the rod and separates an inner volume of the inner cylindrical tube into a compression chamber and an extension chamber, wherein at least the compression chamber contains oil,
wherein the compression chamber and the extension chamber are sealingly separated from each other by the plunger,
wherein the inner cylindrical tube and the outer cylindrical tube enclose with each other a reservoir chamber which contains a pressurized gas in a first portion thereof and oil in a remaining portion thereof and is permanently in fluid communication with the extension chamber via at least one first passage provided in the inner cylindrical tube,
wherein the actuator further comprises an electrically-operated flow control valve which is interposed between the compression chamber and the reservoir chamber and is movable between a first operating position and a second operating position in such a manner that when the flow control valve is in the first operating position movements of the plunger and of the rod are allowed both in the compression direction and in the extension direction, whereas when the flow control valve is in the second operating position movements of the plunger and of the rod are allowed in the extension direction only,
wherein the cylinder further comprises an intermediate cylindrical tube which extends along the longitudinal axis (z) between the inner cylindrical tube and the outer cylindrical tube and encloses, along with the inner cylindrical tube, an intermediate chamber which contains oil and is permanently in fluid communication with the compression chamber via at least one second passage provided in the inner cylindrical tube,
wherein the flow control valve is associated to the intermediate cylindrical tube to control the flow of the oil between the intermediate chamber and the reservoir chamber, the flow control valve allowing, when it is in the first operating position, the oil to flow between the intermediate chamber and the reservoir chamber and preventing, when it is in the second operating position, the oil from flowing between the intermediate chamber and the reservoir chamber, and
further comprising a check valve associated to the inner cylindrical tube to allow the oil to flow in the direction from the reservoir chamber to the compression chamber only.

2. The hydraulic linear actuator as set forth in claim 1, wherein the flow control valve comprises a valve body which extends through the outer cylindrical tube and has communication passages for communication with the intermediate chamber and the reservoir chamber, respectively, a closure member movable in the valve body to open or close the communication passages for communication with the reservoir chamber, and a solenoid coil for controlling the movement of the closure member.

3. The hydraulic linear actuator as set forth in claim 2, wherein the flow control valve further comprises a biasing spring acting on the closure member to univocally determine the position of the closure member in the condition where the solenoid coil is not energized.

4. The hydraulic linear actuator as set forth in claim 2, wherein the solenoid coil of the flow control valve is placed outside the outer cylindrical tube of the cylinder.

5. The hydraulic linear actuator as set forth in claim 1, wherein said first portion of the reservoir chamber is an upper portion of that chamber.

6. The hydraulic linear actuator as set forth in claim 1, wherein the extension chamber contains oil only.

7. The hydraulic linear actuator as set forth in claim 1, wherein the extension chamber contains pressurized gas only.

8. The hydraulic linear actuator as set forth in claim 1, wherein the extension chamber contains both oil and pressurized gas.

9. The hydraulic linear actuator as set forth in claim 1, wherein the reservoir chamber is an annular chamber.

10. The hydraulic linear actuator as set forth in claim 1, wherein the intermediate chamber is an annular chamber.

* * * * *